United States Patent [19]
Hodges et al.

[11] Patent Number: 5,481,774
[45] Date of Patent: Jan. 9, 1996

[54] SUPPORT MECHANISM FOR A DOCKLEVELER LIFT BAG

[75] Inventors: Charles H. Hodges, Ruxton, Md.; Robert J. Warner, Mukwonago, Wis.

[73] Assignee: Kelley Company, Inc., Milwaukee, Wis.

[21] Appl. No.: 131,988

[22] Filed: Oct. 4, 1993

[51] Int. Cl.⁶ .................................................. E01D 1/00
[52] U.S. Cl. ..................................... 14/71.7; 254/93 HP
[58] Field of Search .................................. 14/69.5, 71.1, 14/71.3, 71.7; 254/88, 93 HP

[56] References Cited

U.S. PATENT DOCUMENTS

| | | |
|---|---|---|
| 2,495,092 | 1/1950 | Cox et al. . |
| 2,804,118 | 8/1957 | Bayerkohler . |
| 3,211,425 | 10/1965 | Greulich et al. . |
| 3,521,861 | 7/1970 | Freudenthal et al. . |
| 3,528,118 | 9/1970 | Smith . |
| 3,659,899 | 5/1972 | Phillips et al. ................ 298/22 R |
| 3,711,157 | 1/1973 | Smock ............................ 298/8 R |
| 4,081,874 | 4/1978 | Artzberger ....................... 14/71.7 |
| 4,293,969 | 10/1981 | Frommelt ....................... 14/71.1 |
| 4,572,579 | 2/1986 | Saito ............................... 298/1 A |
| 4,688,760 | 8/1987 | Garman et al. ............... 254/93 HP |
| 4,955,923 | 9/1990 | Hageman ........................ 14/71.7 |
| 5,042,103 | 8/1991 | Megens .......................... 14/71.7 |

FOREIGN PATENT DOCUMENTS

| | | |
|---|---|---|
| 2354388 | 10/1973 | Germany . |
| 3743551 | 7/1989 | Germany ..................... 254/93 HP |
| 161243 | 7/1964 | U.S.S.R. . |
| 835142 | 5/1960 | United Kingdom . |

*Primary Examiner*—Ramon S. Britts
*Assistant Examiner*—James A. Lisehora
*Attorney, Agent, or Firm*—Michael, Best & Friedrich

[57] ABSTRACT

A support and attachment mechanism for a dock leveler lift bag. The dock leveler includes a supporting structure which is mounted in a pit in a loading dock and the rear end of a ramp is pivoted to the supporting structure so that the ramp is movable between a horizontal position and an upwardly inclined position. A bag support member is pivoted to the supporting structure and is located in the pit beneath the ramp. An inflatable bag assembly is located adjacent the rear end of the ramp and is positioned between the underside of the ramp and the bag support member. By inflating the bag assembly, the ramp can be pivoted from the horizontal to the upwardly inclined position. The bag assembly includes a rearwardly extending tether which is secured to the supporting structure and prevents the bag assembly from squeezing forwardly as the bag assembly is inflated. The deflated bag assembly can be drawn upwardly against the underside of the ramp by pivotal movement of the bag support member to provide access to the pit.

13 Claims, 2 Drawing Sheets

SUPPORT MECHANISM FOR A DOCKLEVELER LIFT BAG

BACKGROUND OF THE INVENTION

Dock levelers or dock boards are mounted on loading docks and are adapted to bridge the gap between the dock and the bed of a truck or carrier parked in front of the dock to enable material handling equipment, such as a forklift truck to move between the dock and the truck bed.

The typical dock leveler includes a frame or supporting structure which is mounted in a pit or depression in the loading dock and the rear end of a ramp or deck plate is pivoted to the supporting structure so that the ramp is movable between a horizontal cross traffic position and an upwardly inclined position.

Hinged to the forward end of the ramp is an extension lip which is movable between a downwardly hanging pendant position and an extended position where the lip forms an extension to the ramp.

After a truck has parked in front of the loading dock in preparation for a loading operation, the ramp of the conventional dock leveler is pivoted upwardly and as the ramp approaches its upwardly inclined position, the lip is pivoted outwardly to the extended position. As the ramp is subsequently lowered, the extended lip will engage the bed of the truck. After the loading operation has been completed, the lip will fall by gravity to the pendant position as the truck pulls away from the loading dock.

Traditionally, the ramp of the dock leveler has been operated either by a mechanical or hydraulic mechanism. With a typical mechanical operation, an extension spring is mounted in the pit beneath the ramp and is connected through a lever arm to the rear edge of the ramp. When a ramp holddown mechanism is released, the force of the spring will pivot the ramp to the upwardly inclined position.

With a hydraulically-operated dock leveler, a hydraulic cylinder unit is connected between the supporting frame and the ramp and through extension of the cylinder unit, the ramp will be pivoted to the upwardly inclined position.

U.S. patent application Ser. No. 07/814,002, filed Dec. 26, 1991, now abandoned describes an inflatable bag mechanism that is utilized to pivot the ramp to the upwardly inclined position. As described in that patent application, a pleated bag is interposed between the bottom of the pit in the loading dock and the undersurface of the ramp. By inflating the bag with low pressure air, the ramp will be pivoted to the upwardly inclined position.

SUMMARY OF THE INVENTION

The invention is directed to an improvement to the dock leveler Lift bag construction as shown in U.S. patent application Ser. No. 07/814,002 filed Dec. 26, 1991, and in particular, to an improved support and attachment mechanism for the bag.

The dock leveler includes a ramp having its rear edge hinged to a frame or supporting structure mounted on the loading dock and a bag support member is spaced beneath the ramp and is engaged with the lower surface of the pit in the loading dock.

Mounted between the under surface of the ramp and the bag support member is an inflatable bag assembly, preferably composed of a plurality of vertically superimposed bags. The bags are joined together along contiguous surfaces and openings are provided in the contiguous surfaces to interconnect the interiors of the bag. The bag assembly is preferably located immediately adjacent the rear end of the ramp.

By inflating the bag assembly, the ramp will be pivoted upwardly from the horizontal position to the upwardly inclined position.

As a feature of the invention, each bag in the assembly is provided with a rearwardly extending strip which serves as a tether and the tethers are secured to the bag support member. With this tethering arrangement, the bag assembly is prevented from squeezing forwardly as the bag is inflated.

As a further feature of the invention, a lifting mechanism can be incorporated with the forward end of the bag support member to pivot the bag support member upwardly against the ramp when the bags are in a deflated condition. The lifting mechanism preferably takes the form of cables which are attached to the forward edge of the bag support member.

After the ramp has been pivoted upwardly to the inclined position through inflation of the bag assembly, the ramp is held in the inclined position by inserting one or more maintenance struts between the ramp and the lower surface of the pit. With the ramp maintained in the upwardly inclined position, the bag assembly is deflated and the bag support member is pivoted upwardly through operation of the cables, thereby drawing the deflated bags against the under surface of the ramp to provide access to the pit for either cleaning or maintenance purposes.

The tethers, which are formed integrally with the bags of the bag assembly, provide a convenient manner of securing the bag assembly to prevent the bag assembly from being squeezed forwardly as the bag assembly is inflated.

By locating the bag assembly immediately adjacent the rear end of the ramp, lesser inflation of the bag is required to pivot the ramp to its inclined position. Locating the bag assembly at the rear of the ramp also positions the bag assembly in a more protected position.

Other objects and advantages will appear during the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
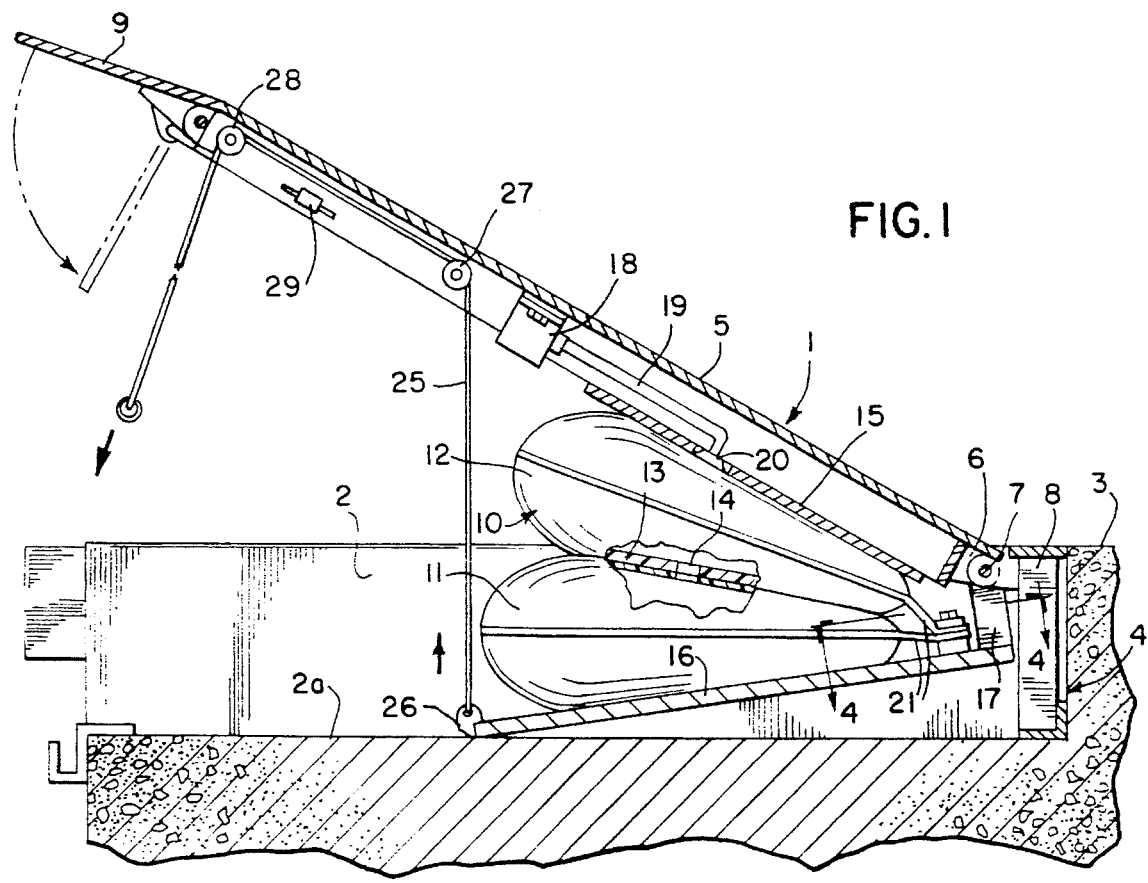
FIG. 1 is a vertical section of a dock leveler incorporating the invention with the ramp being shown in the upwardly inclined position.

FIG. 1 illustrates a dock leveler 1 which is mounted in a pit or depression 2 in a loading dock 3. Dock leveler 1 is adapted to bridge the gap between the loading dock 3 and the bed of a truck or carrier parked in front of the loading dock.

Dock leveler 1 includes a frame or supporting structure 4 which is mounted in the rear end of pit 2 and the rear end of a ramp or deck plate 5 is pivoted to the frame 4 so that the ramp is movable between a generally horizontal cross traffic position and an upwardly inclined position, as shown in FIG. 1.

To pivot the ramp 5 to frame 4, a series of lugs 6 are mounted in spaced relation on the rear end of the ramp and are pivoted through hinge pin 7 to vertical legs 8 of frame 4.

Hinged to the forward end of ramp 5 is an extension lip 9 which is adapted to be pivoted from a downwardly hanging pendant position, as shown by the dashed lines in FIG. 1, to an outwardly extending position where it forms an extension to ramp 5. Lip 9 can be moved from the pendant to the extended position and held in that position by various mechanical, hydraulic, or pneumatic mechanisms, and the lip lifting and latching mechanism is not, in itself, a part of the present invention.

In accordance with the invention, an inflatable bag assembly 10 is located in the pit 2 beneath ramp 5 and by inflating the bag assembly, ramp 5 can be pivoted from the horizontal to the upwardly inclined position.

Bag assembly 10 is composed of a plurality of vertically superimposed bags 11 and 12. While the drawings show a pair of bags 11 and 12, it is contemplated that any number of bags can be utilized in the bag assembly.

The construction of the bag assembly 10 can be similar to that described in pending U.S. patent application Ser. No. 08/131,981, filed Oct. 4, 1993. Bags 11 and 12 are preferably formed of fabric, such as nylon, impregnated with a thermoplastic resin and have contiguous horizontal surfaces which are joined together along an annular joined or sealed area 13 that borders an unsealed central area. One or more holes 14 extend through the central area to provide communication between the interiors of the bag.

Figure 4:
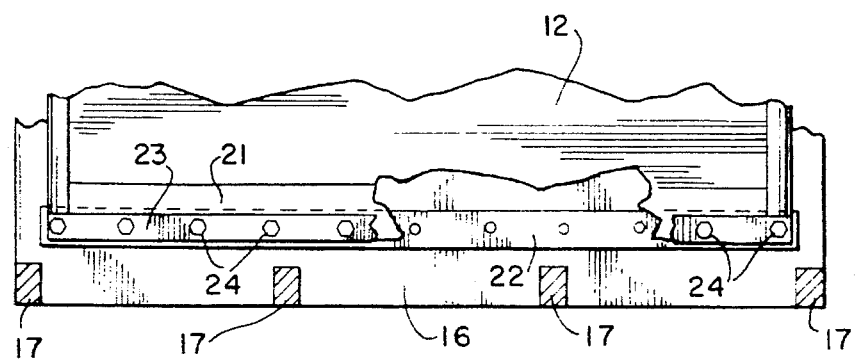
FIG. 4 is a section taken along line 4—4 of FIG. 1 and showing the attachment of the tethers to the bag support member.

The upper surface of bag assembly 10 bears against a plate 15 which is mounted to the underside of ramp 5, while the lower surface of bag assembly 10 is supported on a bag support member or frame 16. Frame 16 preferably takes the form of a generally flat plate that extends substantially the full width of ramp 5, as seen in FIG. 4. The forward edge of frame 16 bears against the floor 2a of pit 2, while the rear end of the frame is spaced above floor 2a and carries a series of generally vertical legs 17 which are mounted for pivotal movement on hinge pin 7. With this arrangement, frame 16 can be pivoted relative to the frame or supporting structure 4 of the dock leveler.

To inflate the bag assembly 10, a low pressure fan 18, similar to that described in pending U.S. patent application Ser. No. 07/814,002, filed Dec. 26, 1991, is mounted to the under surface of the ramp 5 between the spaced parallel beams of the ramp. The outlet of fan 18 is connected through air line 19 to a fitting 20 in the bag 11. With this construction, operation of fan 18 will inflate the bags 11 and 12, as shown in FIG. 1, to pivot the ramp to the upwardly inclined position.

As a feature of the invention, a mechanism is provided for preventing the bag assembly 10 from squeezing forwardly as the bag assembly is inflated. Each bag 11 and 12 is provided with a rearwardly extending flap or tether 21. Tethers 21 are clamped against a bar 22 on bag support frame 16 by an upper clamping bar 23 and bolts 24. With the tethers 21 firmly connected to the bag support frame 16, the bags 11 and 12 will be prevented from moving forwardly as the bag assembly is inflated.

As a further feature of the invention, a mechanism is incorporated to pull the deflated bag assembly 10 upwardly against the under surface of the ramp 5 to provide access to pit 2 for cleaning and maintenance purposes. In this regard, one or more cables 25 are attached to the eye 26 on the forward edge of frame 16. Each cable 25, as shown in FIG. 1, passes over a pair of pulleys 27 and 28 mounted on ramp 5. The free end of each cable 25 can be connected to a suitable tie-down 29 on ramp 5.

Figure 2:
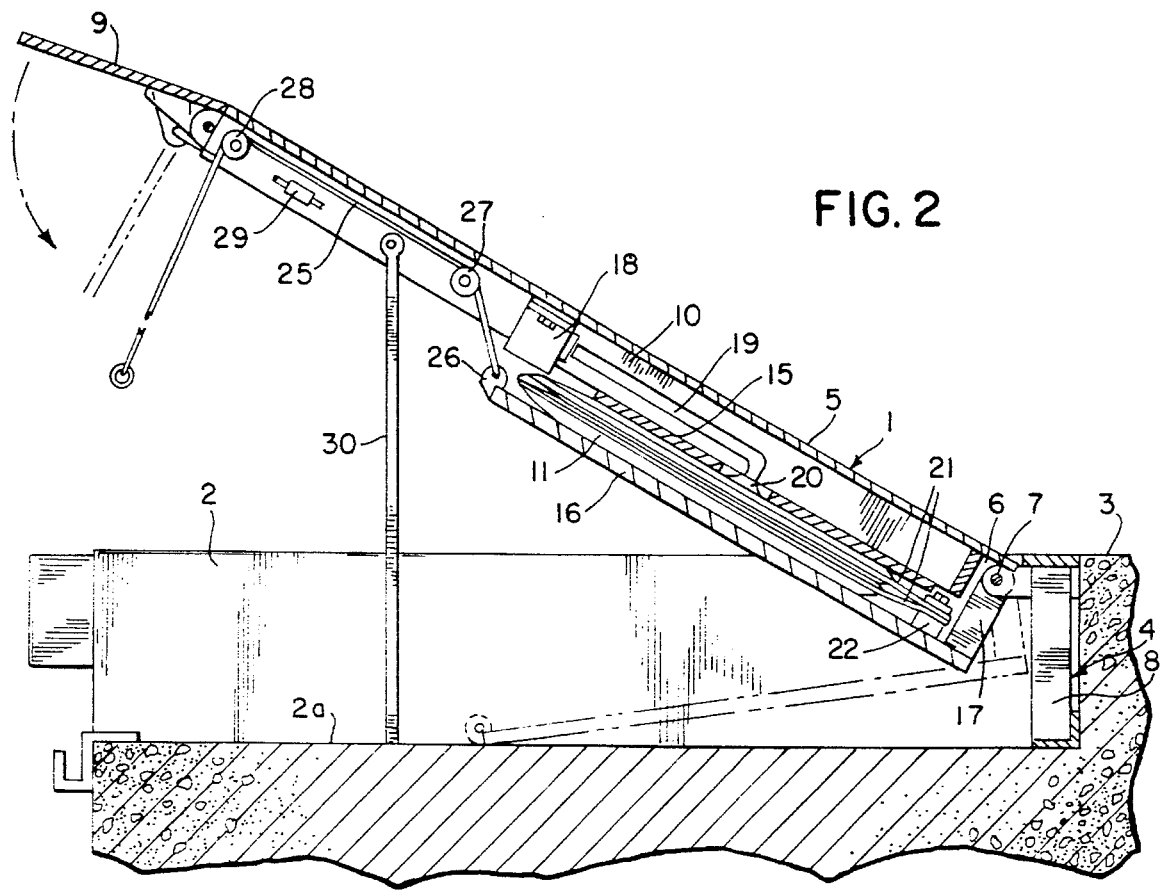
FIG. 2 is a view similar to FIG. 1 showing the ramp retained in the inclined position by a maintenance strut and the deflated bag assembly drawn upwardly against the ramp.
Figure 3:
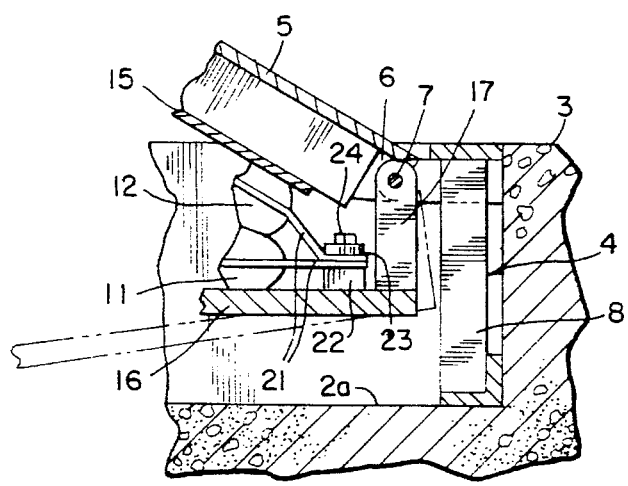
FIG. 3 is an enlarged vertical section showing the connection of the ramp and the bag support member to the frame or the dock leveler.

After the ramp 5 has been pivoted to the upwardly inclined position, as shown in FIG. 1, by inflation of bag assembly 10, one or more maintenance struts 30, as seen in FIG. 2, are inserted between floor 2a of pit 2 and the ramp 5 to hold the ramp in the inclined position. Operation of fan 18 is then discontinued to deflate the bags 11 and 12, and by drawing on cables 25, the bag support frame 16 can be pivoted upwardly drawing the deflated bags 11 and 12 against the upper plate 15, as shown in FIG. 2. Cables 25 can then be secured to tie-downs 29 to maintain frame 16 in the upper position. This action clears the pit and provides access for cleaning or maintenance.

As bag assembly 10 is positioned adjacent the rear end of the ramp, a lesser expansion of the bag assembly is required to pivot the ramp 5 to the upwardly inclined position, as opposed to a bag assembly that is located adjacent the forward edge of the ramp.

Various modes of carrying out the invention are contemplated as being within the scope of the following claims, particularly pointing out and distinctly claiming the subject matter which is regarded as the invention.

I claim:

1. In a dock leveler, a supporting structure, a ramp having a rear edge hinged to the supporting structure and movable between a generally horizontal position and an upwardly inclined position, bag support means spaced beneath the ramp, an inflatable bag assembly disposed between and ramp and the bag support means, mounting means for mounting said bag support means for movement relative to said ramp, said mounting means including pivot means for pivoting said bag support means to the ramp to permit said bag support means to be pivoted upwardly toward a position adjacent the underside of the ramp when said bag assembly is deflated, said pivot means comprising a hinge connection between said ramp and said supporting structure.

2. The dock leveler of claim 1, wherein said bag assembly comprises a plurality of vertically superimposed bags.

3. The dock leveler of claim 2, wherein said bags have contiguous interconnected surfaces.

4. The dock leveler of claim 1, wherein said bag assembly is disposed adjacent a rear end of the ramp.

5. In a dock leveler, a supporting structure, a ramp having a rear edge hinged to the supporting structure at a hinge connection and movable between a generally horizontal position and an upwardly inclined position, an inflatable bag assembly disposed beneath the ramp, bag support means located beneath said bag assembly and disposed to support said bag assembly, said support means being mounted for pivotal movement on said hinge connection between said ramp and said supporting structure, inflatable means for inflating the bag assembly to thereby pivot the ramp from the horizontal position to the upwardly inclined position, a tether extending rearwardly from said bag assembly, and connecting means connecting the tether to said bag support means for preventing forward movement of the bag assembly as the bag assembly is inflated.

6. The dock leveler of claim 5, wherein said tether extends substantially the full width of said bag assembly.

7. The dock leveler of claim 5, wherein said bag assembly comprises a plurality of vertically superimposed bags, each bag having a rearwardly extending tether, said connecting means being connected to each tether.

8. The dock leveler of claim 5, wherein said bag support means comprises a generally flat plate disposed at an acute angle to the ramp when the ramp is in the horizontal position.

9. The dock leveler of claim 8, wherein a forward end of the plate is engaged with the supporting structure.

10. In a dock leveler, a supporting structure, a ramp having a rear end hinged to the supporting structure and movable between a generally horizontal position and an upwardly inclined position, bag support means spaced beneath the ramp, an inflatable bag assembly disposed between the ramp and the bag support means, inflating means for inflating the bag assembly to pivot the ramp from the horizontal position to the upwardly inclined position, pivot means for pivoting said bag support means to the ramp to permit said bag supporting means to be pivoted toward a position adjacent an underside of the ramp when the bag assembly is in the deflated condition, and operating means connected to a forward end of said bag supporting means for pivoting said bag supporting means toward said position.

11. The dock leveler of claim 10, wherein said operating means comprises a cable.

12. In a dock leveler, a supporting structure, a ramp having a rear end hinged to the supporting structure and movable between a generally horizontal position and an upwardly inclined position, bag support means spaced beneath the ramp, an inflatable bag assembly comprising a plurality of vertically superimposed bags disposed between the ramp and the bag support means, inflating means for inflating the bag assembly to pivot the ramp from the horizontal position to the upwardly inclined position, pivot means for pivoting said bag support means relative to the ramp to permit said bag support means to be pivoted toward the underside of the ramp when the bag assembly is in the deflated condition, and tether means comprising a tether strap interconnecting a rear portion of each bag and said bag support means to prevent said bag assembly from squeezing forwardly as the bag assembly is inflated.

13. The dock leveler of claim 12, wherein said tether strap extends substantially the full width of said bag assembly.

* * * * *